Patented Feb. 19, 1929.

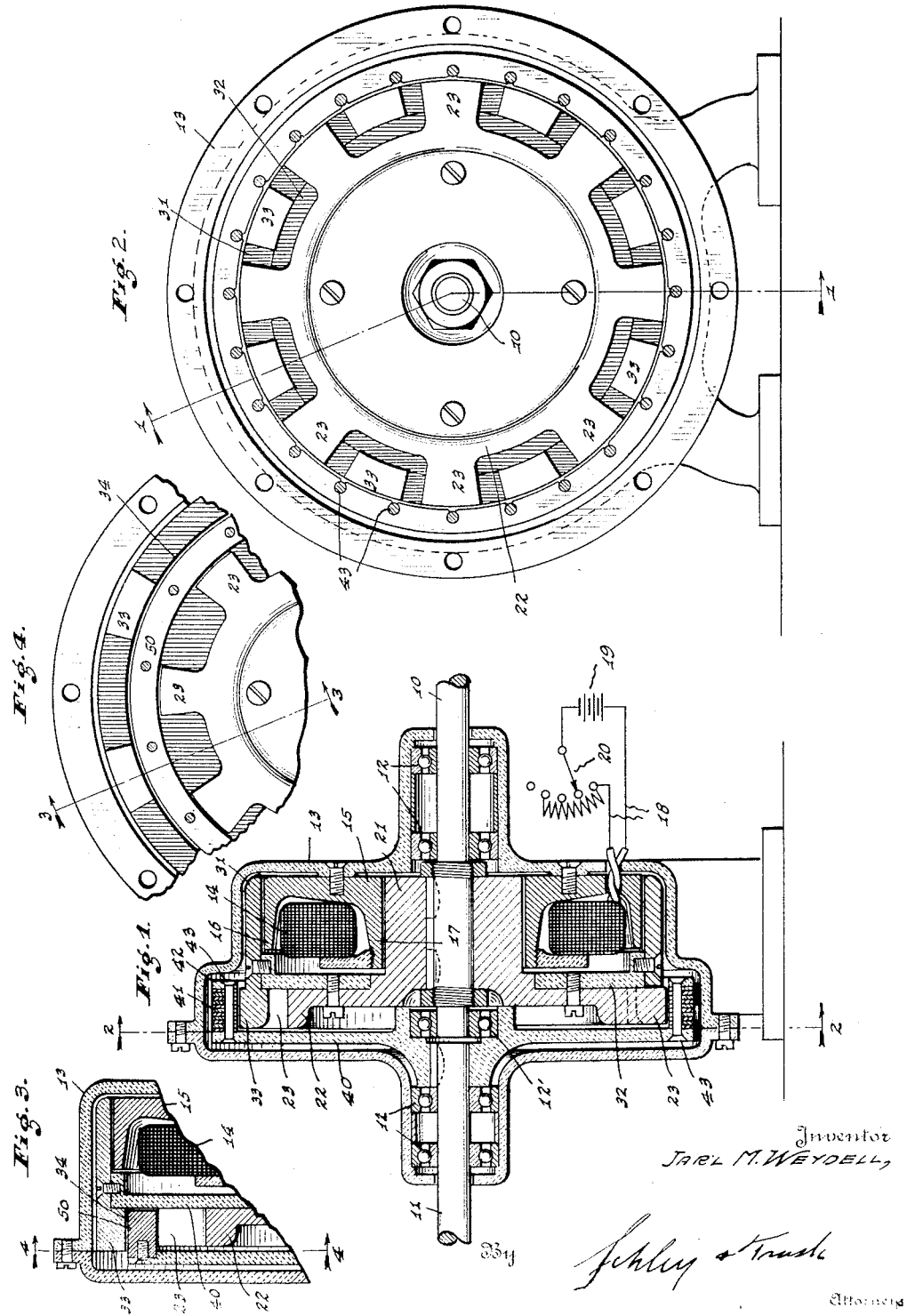

1,702,755

UNITED STATES PATENT OFFICE.

JARL M. WEYDELL, OF INDIANAPOLIS, INDIANA, ASSIGNOR OF ONE-HALF TO EDWARD E. STOUT.

MAGNETIC CLUTCH.

Application filed June 9, 1927. Serial No. 197,667.

The present invention is in large part an improvement and development of that set forth in my prior Patent No. 1,271,401, granted July 2, 1918.

It is the fundamental object of my present invention, as it was that of such prior patent, to produce an electro-magnetic clutch for connecting two moving parts, and to do so without any sliding contacts and without any moving parts to which outside current must be supplied; that is, to provide an electro-magnetic clutch which is energized by a stationary coil.

It is a further object of the present invention to improve the efficiency of such an electro-magnetic clutch, and to simplify its construction; and to provide a clutch in which there is a relative slip between the driving and driven member that for a given magnetization is a direct and smooth function of the load.

The accompanying drawings illustrate my invention: Fig. 1 is an axial section through a magnetic clutch embodying one form of my invention, being taken substantially on the line 1—1 of Fig. 2, and showing diagrammatically the electrical connections; Fig. 2 is a section on the line 2—2 of Fig. 1; and Figs. 3 and 4 are fragmental sectional views generally corresponding to Figs. 1 and 2, substantially on the lines 3—3 of Fig. 4 and 4—4 of Fig. 3 respectively, but showing a magnetic clutch embodying a somewhat different form of my present invention.

Two alined shafts 10 and 11 are mounted in suitable bearings 12 in the stationary frame 13; and are the shafts which are to be drivingly interconnected by the magnetic clutch. The casing 13 is shown as furnishing support for the adjacent ends of said two shafts, although such support is not essential to my invention, as either the shafts or the casing may be the carrier. Further, both the shafts 10 and 11 are shown as solid shafts, rather than as sleeves; but that also is not essential. Either shaft 10 or 11 may be the driving shaft, and either the driven shaft. Desirably, the abutting ends of the two shafts 10 and 11 have a bearing 12′ on each other.

The stationary frame 13 is of suitable non-magnetic material, such as brass or aluminum, and supports the magnetizing coil 14 of the magnetic clutch; so that such magnetizing coil is also stationary. The stationary non-magnetic casing carries or has formed as part of it a stationary magnetic member 15, which is part of the magnetic circuit. This magnetic member 15 is in the form of a ring lying axially at one end of the stationary coil 14, and desirably has axially extending outer and inner annular flanges 16 and 17 which extend axially partway along the outer and inner surfaces of the coil 14.

The magnetic member 15 is shown as a solid member, as it is ordinarily unnecessary to laminate it; but my invention does not preclude having such member laminated. The connection wires 18 for the magnetizing coil 14 may pass through suitable openings in the magnetic member 15 and non-magnetic casing 13 for suitable connection to a source of current such as a battery 19, and to a suitable controlling device such as a rheostat 20 by which the circuit of the magnetizing coil may be made and broken and by which desirably the strength of magnetization may be varied.

The shaft 10 has fixed thereto a magnetic-material member 21, shown as solid though not necessarily so especially in the larger machines, which is located within the opening in the coil 14 and stationary magnetic member 15, and fits fairly closely within the inner annular flange 17 with just sufficient clearance for free operation, so that the air gap will be small. The rotatable magnetic member 21 has an outwardly extending flange 22 at its axial end remote from the stationary magnetic member 15, so that the stationary coil 14 lies axially between such rotating flange 22 and the stationary magnetic member 15. At its outer periphery, the flange 22 is provided with a series of radially outwardly projecting fingers 23, which constitute definite polar projections, all of the same polarity. The drawing shows eight such polar projections 23; but that number is a mere incident, as any desirable number of such polar projections may be used.

In addition to the inner magnetic-material member 21, which lies within the coil 14, the shaft 10 also carries an outer magnetic-material member 31; which lies circumferentially outside of the magnetizing coil 14 and stationary magnetic member 15 and fits fairly closely around the outer annular flange 16 with just sufficient clearance for free operation, so that the air gap will be small. This outer rotatable magnetic member 31 is carried from the inner rotatable magnetic member 21 by a carrying member 32 of non-magnetic material; so that the two members 31 and 21 are not magnetically contiguous. As shown, both magnetic members 21 and 31 are fastened to the non-magnetic ring 32 by suitable attaching screws. The outer magnetic member 31 at its axial end remote from the stationary magnetic member 15 is provided with a series of axially projecting fingers 33, which constitute definite polar projections, all of the same polarity. The number of polar projections 33 is equal to the number of polar projections 23; and are all of the opposite polarity from the projections 23. The polar projections 23 and 33, of opposite polarity, alternate circumferentially, as is clear from Figs. 2 and 4, and are in fixed relation to one another. This circumferential alternation of the poles of opposite polarity is one of the important features of the present invention; and is a feature of both modifications shown, as illustrated in Figs. 1 and 2, and Figs. 3 and 4, respectively.

The two illustrated embodiments of the invention differ from each other, however, in that in the embodiment shown in Figs. 1 and 2 the polar projections 23 actually project radially outward between the polar projections 33, as is clear from Fig. 2, whereas in the embodiment shown in Figs. 3 and 4 the outer ends of the radial projections 23 lie radially inwardly of the radially inward faces of the projections 33 to provide a free annular space 34, the purpose of which will be described later.

The shaft 10 with the parts 21, 22, 23, 31, 32, and 33 constitutes one of the two clutch members between which the clutch is to transmit the power; and by reason of the magnetization produced by the stationary coil 14, there exists in connection with this clutch member a magnetic field between the polar projections 23 and the polar projections 33—which polar projections are alternately of opposite polarity around the circumference of said rotatable member. This magnetic field rotates with the shaft 10, at the same speed.

The other clutch member comprises the shaft 11, a carrying disk 40 of non-magnetic material fixed on said shaft to rotate therewith, and a rotor member carried by and rotatable with said carrying disk 40 and located in the field between the polar projections 23 and the polar projections 33. This rotor member is arranged to have currents induced in it by its relative movement in the aforesaid magnetic field, the production of which induced currents consumes energy, and thus creates a drag between said rotor member and the rotating field from the polar projections 23 and 33, tending to make said polar projections and said rotor member (and therefore the two shafts 10 and 11) rotate together, with a relative slip between them dependent upon the load transmitted and on the strength of the field produced by the stationary coil 14.

The rotor member is similar in effect to the rotor of an induction motor.

This rotor member may take various forms, of which I have illustrated two. In the form shown in Figs. 1 and 2, where the poles 23 actually project radially outward between the poles 33 as illustrated in Fig. 2, the rotor member lies radially outside of both sets of poles 23 and 33, and surrounds the entire circumferential series of such poles 23 and 33. In the arrangement shown in Figs. 3 and 4, the rotor member lies in the annular space 34 above referred to, thus being radially outside of the circumferential poles 23 and radially inside of the circumferential poles 33.

The two forms will be explained separately.

In the arrangement shown in Figs. 1 and 2, the rotor member is desirably in effect a squirrel-cage rotor. It comprises a series of annular laminæ 41 clamped between the carrying disk 40 on one side and an end-connection ring 42 on the other side by rivets 43 which serve both as clamping rivets and as squirrel-cage bars for carrying the induced currents. The laminæ 41 surround the circumferential series of poles 23 and 33, with a sufficient air gap between for mechanical clearance; and serve to carry the magnetic lines of force between the poles 23 of one polarity and the poles 33 of the other polarity. Upon relative rotation between the poles 23 and 33 on the one hand and the laminæ 41 on the other hand, the cross-connectors 43 cut the magnetic lines of force, so that currents are induced in such cross-connectors. Such cutting of the lines of force by the cross-connectors is in opposite directions over the poles 23 and over the poles 33, so that some of the cross-connectors develop differences of potential tending to create current flow from the disk 40 to the ring 42 while others develop differences of potential tending to create current flow in the opposite direction. Such current flow occurs, as the circuit is complete from one cross-connector to another through the carrying disk 40 and the connection ring 42 in the same manner as in a squirrel-cage rotor.

For greater effectiveness in this generation of induced currents, the rivets constituting the cross-connectors of the squirrel-cage rotor are desirably located fairly close to the inner edges of the laminæ 41; and desirably the holes in which such rivets lie communicate with radial slots 44 extending inward to the inner edges of the laminæ to provide open slots, as it were, to compel the lines of force generally to pass radially outward in the laminæ beyond the rivets 43, so that the greater part of such lines of force may be cut by the rivets 43 upon relative rotation between the magnetic field to the poles 23 and 33 and the rotor 40—41—42—43.

Although I prefer a rotor member of the squirrel-cage type when such rotor member lies radially on the same side of both sets of poles 23 and 33, as is illustrated in Figs. 1 and 2, yet my invention does not preclude other forms of induction-motor rotors in that location.

In the arrangement shown in Figs. 3 and 4, the rotor member lies in the annular space 34, radially between the circumferential series of poles 23 of one polarity and the circumferential series of poles 33 of the other polarity. Any type of induction rotor may be used here; but the simplest type is a simple ring 50 of iron, which serves to carry the magnetic lines of force between the poles 23 of one polarity inside of it and the poles 33 of the other polarity outside of it.

Upon relative rotation between the iron ring 50 and the field between the poles 23 and 33, the magnetic field travels circumferentially in the iron ring 50, and develops eddy currents which tend to oppose such relative rotation. This produces a drag between the two members of the clutch, tending to make the two shafts 10 and 11 rotate together, with a slip dependent upon the load transmitted and upon the strength of the field produced by the stationary coil 14.

I claim as my invention:

1. A magnetic clutch, comprising a rotary member having two magnetically separate magnetic portions, each of said magnetic portions having polar projections which are spaced from the polar projections of the other magnetic portion, all of said polar projections lying substantially in the same plane and the polar projections of one magnetic portion being angularly displaced from those of the other magnetic portion, a second rotary member having thereon an induction-motor rotor in inductive relation to said polar projections, a stationary magnetic member in close proximity to and magnetically between the two magnetic portions of said first rotary member, and a stationary magnetizing coil in magnetizing relation to said stationary magnetic member and to the magnetic portions of said first rotary member.

2. A magnetic clutch, comprising a rotary member having two magnetically separate magnetic portions, each of said magnetic portions having polar projections which are spaced from the polar projections of the other magnetic portion, the polar projections of one magnetic portion being angularly displaced from those of the other magnetic portion, a second rotary member having thereon an induction-motor rotor in inductive relation to said polar projections, a stationary magnetic member in close proximity to and magnetically between the two magnetic portions of said first rotary member, and a stationary magnetizing coil in magnetizing relation to said stationary magnetic member and to the magnetic portions of said first rotary member.

3. A magnetic clutch, comprising a rotary member having two magnetically separate magnetic portions, each of said magnetic portions having polar projections which are spaced from the polar projections of the other magnetic portion, all of said polar projections lying substantially in the same plane, a second rotary member having thereon an induction-motor rotor in inductive relation to said polar projections, a stationary magnetic member in close proximity to and magnetically between the two magnetic portions of said first rotary member, and a stationary magnetizing coil in magnetizing relation to said stationary magnetic member and to the magnetic portions of said first rotary member.

4. A magnetic clutch, comprising a rotary member having two magnetically separate magnetic portions, each of said magnetic portions having polar projections which are spaced from the polar projections of the other magnetic portion, a second rotary member having thereon an induction-motor rotor in inductive relation to said polar projections, a stationary magnetic member in close proximity to and magnetically between the two magnetic portions of said first rotary member, and a stationary magnetizing coil in magnetizing relation to said stationary magnetic member and to the magnetic portions of said first rotary member.

5. A magnetic clutch, comprising a rotary member having two magnetically separate magnetic portions, each of said magnetic portions having polar projections which are spaced from the polar projections of the other magnetic portion, a second rotary member having thereon an induction-motor rotor in inductive relation to said polar projections, a stationary magnetic member in close proximity to and magnetically between the two magnetic portions of said first rotary member, and a stationary magnetizing coil in magnetizing relation to said stationary magnetic member and to the magnetic portions of said first rotary member, said induction-motor rotor being of the squirrel-cage type.

6. A magnetic clutch, comprising a rotary member having two magnetically separate magnetic portions, each of said magnetic portions having polar projections which are spaced from the polar projections of the other magnetic portion, a second rotary member having thereon an induction-motor rotor in inductive relation to said polar projections, a stationary magnetic member in close proximity to and magnetically between the two magnetic portions of said first rotary member, and a stationary magnetizing coil in magnetizing relation to said stationary magnetic member and to the magnetic portions of said first rotary member, said induction-motor rotor lying circumferentially outside of both sets of polar projections.

7. A magnetic clutch, comprising a rotary member having two magnetically separate magnetic portions, each of said magnetic portions having polar projections which are spaced from the polar projections of the other magnetic portion, a second rotary member having thereon an induction-motor rotor in inductive relation to said polar projections, a stationary magnetic member in close proximity to and magnetically between the two magnetic portions of said first rotary member, a stationary magnetizing coil in magnetizing relation to said stationary magnetic member and to the magnetic portions of said first rotary member, the two sets of polar projections lying in the same circle with the polar projections of one set angularly displaced from those of the other set, and the induction-motor rotor being in an outer circle surrounding the circle of the polar projections.

8. A magnetic clutch, comprising a stationary magnetic member, a stationary magnetizing coil in magnetizing relation thereto, a rotary member having an inner magnetic portion surrounded by and a magnetically separate outer magnetic portion surrounding said stationary magnetizing coil, said stationary magnetic member being in proximity to and magnetically between said two magnetic portions of said rotary member, and said two magnetic portions of said rotary member having polar projections, and a second rotary member having an induced-current magnetic member in magnetic proximity to both sets of polar projections of said first rotary member.

9. A magnetic clutch, comprising a stationary magnetic member, a stationary magnetizing coil in magnetizing relation thereto, a rotary member having an inner magnetic portion surrounded by and a magnetically separate outer magnetic portion surrounding said stationary magnetizing coil, said stationary magnetic member being in proximity to and magnetically between said two magnetic portions of said rotary member, and said two magnetic portions of said rotary member having polar projections, and a second rotary member having an induced-current magnetic member in magnetic proximity to both sets of polar projections of said first rotary member, the polar projections of the two magnetic portions of said first rotary member being relatively angularly displaced.

In witness whereof, I have hereunto set my hand at Indianapolis, Indiana, this 4th day of June, A. D. one thousand nine hundred and twenty seven.

JARL M. WEYDELL.